US011034601B1

(12) United States Patent
McGuigan et al.

(10) Patent No.: US 11,034,601 B1
(45) Date of Patent: Jun. 15, 2021

(54) SYSTEM AND METHOD FOR TREATING WASTEWATER (71) Applicant: Anua International LLC, Greensboro, NC (US)

(72) Inventors: M. Sean McGuigan, Hanover, VA (US); Colin Bishop, Woodville, TX (US)

(73) Assignee: Anua International LLC, Greensboro, NC (US)

( * ) Notice: Subject to any disclaimer, the term of this patent is extended or adjusted under 35 U.S.C. 154(b) by 0 days.

(21) Appl. No.: 17/175,660

(22) Filed: Feb. 13, 2021

Related U.S. Application Data (60) Provisional application No. 62/976,757, filed on Feb. 14, 2020.

(51) Int. Cl.
| *C02F 3/20* | (2006.01) |
| *C02F 3/00* | (2006.01) |
| *C02F 3/10* | (2006.01) |
| *C02F 1/66* | (2006.01) |

(52) U.S. Cl.
CPC ............ *C02F 3/20* (2013.01); *C02F 1/66* (2013.01); *C02F 3/006* (2013.01); *C02F 3/108* (2013.01); *C02F 2209/06* (2013.01); *C02F 2301/024* (2013.01)

(58) Field of Classification Search
None
See application file for complete search history.

(56) References Cited

U.S. PATENT DOCUMENTS

| 5,202,027 | A | | 4/1993 | Stuth |
| 5,531,898 | A | | 7/1996 | Wickham |
| 5,609,754 | A | * | 3/1997 | Stuth ................. C02F 3/04 |
| | | | | 210/151 |
| 5,853,578 | A | | 12/1998 | Flyaks et al. |
| 6,331,249 | B1 | | 12/2001 | Nelson et al. |
| 6,592,751 | B2 | | 7/2003 | Haridas |
| 7,252,766 | B2 | | 8/2007 | Stuth, Sr. et al. |
| 7,462,285 | B2 | | 12/2008 | Wickham |

(Continued)

FOREIGN PATENT DOCUMENTS

| CN | 1493531 A | 5/2004 | |
| JP | 10263595 | 10/1998 | |
| WO | WO-2020044279 A1 * | 3/2020 | ............... C12N 1/20 |

*Primary Examiner* — Chester T Barry
(74) *Attorney, Agent, or Firm* — Downs Rachlin Martin PLLC (57) ABSTRACT

A system and method to treat wastewater or non-potable water using a reactor that is perforated at its bottom arranged in a vessel at a depth. Air pressure from an air grid at a reactor bottom induces an uplift of liquid and media to move highly aerated liquid through the media, which provides surfaces for microbial attachment and growth. An alkali porous material is suspended in the upswelling liquid that dissolves to reduce acidity and balance the pH of the liquor. The upswell in the reactor is at a higher elevation than the vessel giving directional discharge outlets head or velocity creating stirring and mixing to an area surrounding the reactor. Interchange of mixed and unmixed liquor is provided via the bottom perforations. Provision is also made for unit to cycle off and on so that the media can decant and for solids to settle out of the treatment unit.

30 Claims, 10 Drawing Sheets (56) References Cited

U.S. PATENT DOCUMENTS

| | | | |
|---|---|---|---|
| 7,854,843 B2* | 12/2010 | Pehrson | C02F 3/06 |
| | | | 210/605 |
| 8,257,584 B2 | 9/2012 | Wickham | |
| 9,162,909 B2 | 10/2015 | Gencer et al. | |
| 2003/0102580 A1* | 6/2003 | Khudenko | B01F 3/0876 |
| | | | 261/77 |
| 2004/0035786 A1 | 2/2004 | Goldsmith | |
| 2004/0206701 A1 | 10/2004 | Fife et al. | |
| 2005/0247250 A1* | 11/2005 | Errecalde | B63B 1/322 |
| | | | 114/272 |
| 2007/0181494 A1 | 8/2007 | Cox et al. | |
| 2007/0262019 A1* | 11/2007 | Sengupta | C02F 3/28 |
| | | | 210/611 |
| 2009/0272689 A1 | 11/2009 | Ladouceur | |
| 2009/0321350 A1 | 12/2009 | Nelson et al. | |
| 2010/0155314 A1 | 6/2010 | Lenger et al. | |
| 2010/0193433 A1 | 8/2010 | Hausin et al. | |
| 2013/0001161 A1 | 1/2013 | Boner | |
| 2014/0223819 A1* | 8/2014 | Coghlan | A01K 63/003 |
| | | | 47/62 R |
| 2014/0263047 A1 | 9/2014 | Silva et al. | |
| 2015/0232358 A1 | 8/2015 | Conner et al. | |
| 2015/0353400 A1* | 12/2015 | Dube | C02F 1/286 |
| | | | 210/665 |
| 2016/0051929 A1* | 2/2016 | Harshman | B01D 53/52 |
| | | | 435/3 |
| 2018/0119083 A1 | 5/2018 | Zheng et al. | |
| 2020/0010346 A1* | 1/2020 | Hanson | C02F 3/108 |
| 2020/0189945 A1 | 6/2020 | Gencer et al. | |
| 2021/0002595 A1* | 1/2021 | Sigurgusladottir | C12M 41/26 |
| 2021/0101123 A1* | 4/2021 | Hurd | B01F 7/001 |

\* cited by examiner

SYSTEM AND METHOD FOR TREATING WASTEWATER

RELATED APPLICATION DATA

This application claims the benefit of priority of U.S. Provisional Patent Application Ser. No. 62/976,757, filed Feb. 14, 2020, and titled "System and Method for Treating Wastewater or Non-Potable Water, which is incorporated by reference herein in its entirety.

FIELD OF THE DISCLOSURE

This disclosure relates to onsite or decentralized wastewater treatment systems or non-potable water treatment systems.

BACKGROUND

Onsite or decentralized treatment of various wastewaters, sewage and other types of non-potable water in areas with no conventional sewer system has conventionally been accomplished by septic tank systems or other holding-tank based systems. In septic tank systems, the anaerobic effluent discharged after settling of the solids portion of the incoming wastewater is passed into a subsurface drainfield for percolation into the surrounding soil or discharged on the ground surface through irrigation works or transfer piping to roadside ditches. Such a system works satisfactorily if properly installed and if proper site conditions for disposal of the effluent exist.

In a septic system, waste material is treated by an anaerobic microbiological process, which slowly decomposes the sewage into hydrogen sulfide gas, methane, water and other organic and inorganic constituents. The slow decomposition process associated with septic systems will generally cause solids to accumulate in the system at a fairly high rate, since they are decomposed at a slower rate than they are deposited in the system. This results in a need to clean the accumulated sludge and other solid materials out of the system. It has also been found that in some instances site characteristics are such that the usual septic system cannot be used satisfactorily due to site limiting conditions or degradation to the surrounding environment.

To address limitations with conventional septic systems and in other situations where septic systems may not be possible, small treatment plants that use chemical and/or biological treatment schemes to render the effluent suitable for dispersal have been suggested. These treatment plants usually are designed to replace conventional septic systems. Such small treatment plants, however, are often prohibitively expensive or still too complex for treatment of higher strength effluent streams on smaller scales. Other similar types of treatment plants have been used to renovate non-potable water systems such as agricultural ponds, rainwater, or stormwater. Systems that are capable of effecting a higher organics reduction are economically unfeasible and/or excessively cumbersome. One type of sewage treatment system operates on an aerobic microbiological process. In this type of system, waste materials are broken down into carbon dioxide and water. The aerobic process is more rapid than the anaerobic process.

In some instances, reactors containing microbial growth media and/or filtering devices incorporating aeration features to treat the liquid effluent have been proposed for use in conjunction with septic tanks or other wastewater or non-potable water tanks. In this type of device, air is diffused into a reactor chamber to cause liquor to recirculate within the reactor chamber in the presence of microbial growth media with the reactor chamber being connected directly to the outflow of the treatment tank.

SUMMARY OF THE DISCLOSURE

In view of the foregoing, there is a need for a system with greater efficiency and reliability for the treatment of wastewater and sewage or non-potable water in primary treatment systems such as standard septic tanks, lined pits, or non-potable water holding tanks of all configurations, as well as other traditional anaerobic systems.

In one implementation, the present disclosure is directed to a water treatment apparatus. The apparatus includes a process container having a lower end and an upper end, wherein the process container is configured to be partially submerged in a water treatment vessel with the lower end submerged and the upper end extending above a waterline in the water treatment vessel; one or more intake openings at the lower end of the process container; a first media support positioned above the intake openings, the process container defining a process volume between the waterline and the first media support; an air diffuser disposed below the first media support configured to release air bubbles substantially across a cross-section of the process container when supplied from an air source, the bubbles causing turbulent uplift of water within the process container; an aerobic microorganism supporting media disposed above the first media support, the media occupying 50-80% of the process volume and comprising media elements having openings configured to interact with bubbles released from the air diffuser and a neutral or negative buoyancy selected to provide media uplift and turbulent mixing of the media elements with the turbulent uplift of water in the process container in response to bubble release from the air diffuser; one or more outflow openings in the process container positioned at least approximately at the waterline; and alkaline modulating media dispensable into the area of turbulent uplift of water above the waterline.

In another implementation, the present disclosure is directed to a water treatment system. The systems includes a water treatment vessel configured to contain water to be treated up to a water level; a water treatment unit comprising a process container having a lower end and an upper end disposed in the water treatment vessel with the upper end extending above the water level; one or more water intake openings at the lower end of the process container; a first media support positioned above the intake openings; a first media selected to support growth of biological organism disposed on the first media support; an air diffuser disposed below the first media support configured to release bubbles substantially across a cross-section of the process container when supplied from an air source; an aerobic microorganism supporting media disposed above the first media support, the media occupying at least 50% of the process volume and comprising media elements having openings configured to interact with bubbles released from the air diffuser and a neutral or negative buoyancy selected to provide media uplift and turbulent mixing of the media elements with the turbulent uplift of water in the process container in response to bubble release from the air diffuser; one or more outflow openings in the process container positioned at least approximately at the waterline; alkaline modulating media dispensable into the area of turbulent uplift of water above the waterline; an air supply communicating with the air diffuser; and a controller configured to regulate the air supply to control the air to the air diffuser.

In yet another implementation, the present disclosure is directed to a method of treating water. The method includes charging an air grid arranged at a vertically lower end of a process container; creating a liquid upswell in the process container due to the charging of the air grid; turbulently mixing an aerobic growth media in the process container due to the upswell; mixing aerated water through the aerobic growth media in the process container due to the upswell; and mixing the water in the process container with an alkaline modulating media in the turbulent upswell created by the charging of the air grid.

In still yet another implementation, the present disclosure is directed to a method of treating water. The method includes positioning a process container in a larger vessel containing water to be treated, the process container positioned with a portion of the process container above a water line in the larger vessel; charging an air grid arranged at a vertically lower end of a process container; creating a liquid upswell in the process container due to the charging of the air grid; turbulently mixing an aerobic growth media in the process container due to the upswell; mixing water aerated by the charged air grid through the aerobic growth media in the process container due to the upswell; mixing the aerated water in the process container with an alkaline modulating media in the turbulent upswell created by the charging of the air grid; ejecting aerated water from the process container due to the upswell; and mixing the aerated water with water in the larger vessel outside the process container by the ejecting.

BRIEF DESCRIPTION OF THE DRAWINGS

For the purpose of illustrating the disclosure, the drawings show aspects of one or more embodiments of the disclosure. However, it should be understood that the present disclosure is not limited to the precise arrangements and instrumentalities shown in the drawings, wherein.

DETAILED DESCRIPTION

Disclosed systems and methods provide a robust and efficient mechanism to treat high-strength wastewater streams, including those from commercial facilities such as restaurants, c-stores, food processing, agricultural operations, campgrounds, parks, or schools. "Wastewater" as used herein refers to any non-potable or contaminant-containing streams that must be treated or upgraded prior to appropriate disposal or dispersal. Disclosed systems and methods use treatment units configured as concentrated aerobic reactor pods to reduce waste constituents to levels more suited for further treatment by conventional methods. Disclosed treatment units are also retrofittable into existing systems to upgrade existing systems.

In embodiments disclosed herein, reductions in biological oxygen demand (BOD), chemical oxygen demand (COD), fats, oils and grease (FOG), and ammonia can be achieved in disclosed treatment units with low-hydraulic retention times. Disclosed treatment units employ a hybrid submerged aerated filter (SAF) treatment process that requires significantly less air to achieve treatment and consumes more solids when compared to other technologies. Disclosed treatment units incorporate uniquely configured media beds to accomplish, among other advantages, passive alkalinity control (pH buffering) and significantly increased oxygen transfer for biological organism support. Disclosed treatment unit designs further advantageously permit multiple pod configurations to achieve further reductions in excess waste constituents.

Figure 1:
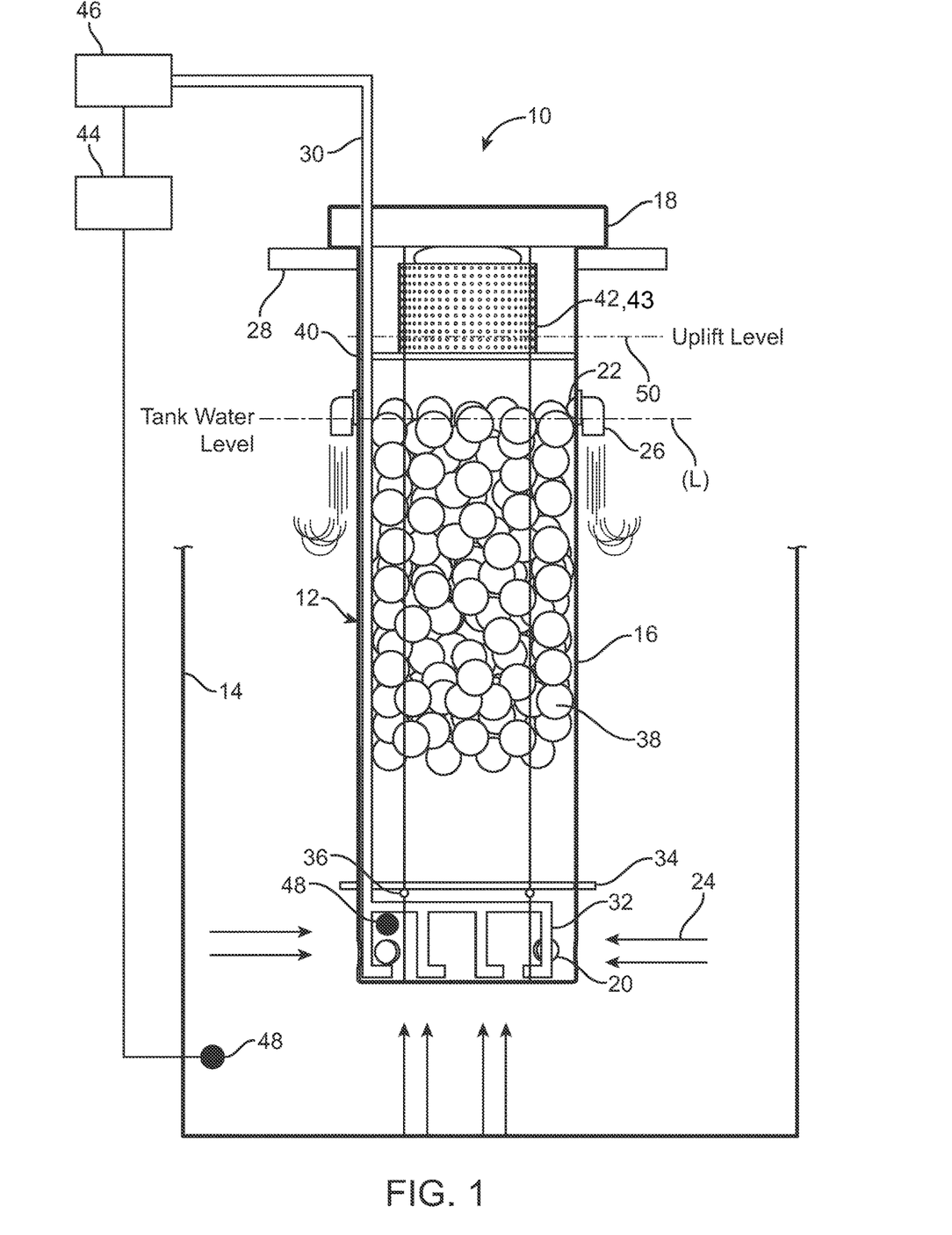
FIG. 1 is a schematic depiction of an embodiment of a treatment system in operation according to the present disclosure.

In one embodiment, as shown in FIG. 1, a wastewater treatment system 10 comprises a wastewater treatment unit 12 arranged in a wastewater treatment vessel 14 at a controlled depth. Treated wastewater from vessel 14 transferred to conventional downstream processes (not shown) as will be understood by persons of ordinary skill based on the teachings presented herein. Wastewater treatment unit 12 forms a process container within which conditions are maintained to optimally support biological organisms providing aerobic treatment of wastewater in vessel 14. As depicted in FIG. 1, treatment unit 12 comprises substantially cylindrical body 16 with an enlarged upper rim 18 defining an open upper end. Cross-sectional shapes other than cylindrical may also be employed. Optionally, a cover may be provided but is not required.

Treatment unit 12 has one or more inflow perforations 20 at its lower longitudinal end and additional outflow perforations 22 disposed at or adjacent to the liquid level (L) within wastewater treatment vessel 14. Inflow perforations 20 allow for wastewater to be drawn into wastewater treatment unit 12. Perforations 20 can be provided as holes, slots, slits, or the like. Perforations or holes 20 may, for example, vary from about 0.5 inch to about 3 inches in width or diameter. Other dimensions are also possible consistent with overall unit scale. According to one aspect of the disclosure, perforations 20 act as a screen to prevent waste materials greater than a specified size from entering wastewater treatment unit 12. Arrows 24 represent wastewater being drawn into wastewater treatment unit 12. During resting periods, solids can leave waste treatment unit 12 via perforations 20. Directional outflow jets 26 are arranged at outflow perforations 22 at the water level (L). In practice, directional outflow jets 26 are typically arranged within about +/-3 inches of the water level (L). According to one aspect of the disclosure, directional outflow jets 26 are arranged about ¾ of the way up cylindrical body 16, measured from the base thereof.

An inside of wastewater treatment unit 12 comprises an air diffuser 32, also referred to as an air grid, arranged at the bottom of vertically oriented cylindrical body 16. An air line 30 is arranged in wastewater treatment unit 12 to supply air diffuser 32 with air. Media support grid 34 is arranged above air diffuser 32 and may itself be supported by support rods 36 extending through holes in the cylindrical body. Support grid 34 may be configured as a grate or lattice and also may be affixed to air line 30. The spaces in the grate or lattice structure of support grid 34 are configured such that the media does not fall through the spaces. The sizing of the spaces also may provide some filtering capability and/or air diffusion.

Wastewater treatment unit 12 is filled below the tank water level in vessel 14, i.e., the waterline (L) with a biological organism supporting media 38. Media 38 is supported on support grid 34 and provides additional surface area for microorganisms growth. Typically, the volume of media 38 will be sufficient to occupy approximately 50% to 85% of the internal volume of treatment unit 12 between the water level and media support 34. It is important that sufficient media be provided to promote adequate aerobic digestion, yet not so much as to limit the beneficial effects of the turbulent mixing by constraining motion due to over packing of the media in the available process volume. In some embodiments, the media-occupied process volume between the water level (L) and media support 34 will be about 60-80% and in others about 75%. In some embodiments, treatment unit 12 is generally supplied with between about 2 and 8 cubic feet of media 38. Media 38 provides a substrate for aerobic microorganisms growth. Media 38 generally may comprise a plastic structured media that is spherical, cylindrical, square, trapezoidal, other polygon, or like shape. Alternatively, media 38 can be wagon-wheel shaped, or the like. It should be noted that more than one shape of media can be used. Preferably, media 38 has at least approximately neutral buoyancy and an open, lattice-like structure to increase surface area and shred air bubbles released from air diffuser 32 so as to further enhance oxygen transfer to the aqueous environment surrounding the media and aerobic microorganisms supported thereon.

Air diffuser 32 injects air into the wastewater treatment unit in various directions when supplied through air line 30. According to one aspect of the disclosure, the air diffuser has a plurality of small holes or open ended pipes 54 (FIG. 7) as air outlets. Injection of air through diffuser 32 provides a number of effects within the process container defined by treatment unit 12. One such benefit is to raise up media 38 off of support 34 and create turbulence for enhanced mixing of the media and organisms thereon with oxygenated wastewater and to promote ejection of excess waste constituents from the media. The rising air within the treatment unit also causes an uplift of the water column therein to an uplift level 50 above the water level (L). Another benefit is increased oxygenation within the concentrated process container space defined by treatment unit 12. The small bubbles created by injection of air under pressure through diffuser 32, combined with the shredding of the bubbles through the media and turbulence created thereby, increase oxygen efficiency as compared to conventional aerobic wastewater treatment systems. Conventional aerobic bed wastewater treatment systems typically have an oxygen transfer to water efficiency in the range of about 2%. With embodiments disclosed herein, preliminary estimates suggest oxygen transfer efficiency of 3-4% and possibly as high as 5%.

In another aspect of disclosed embodiments, vertically above media 38 there is a second support grid 40, arranged on supports (not shown) in wastewater treatment unit 12. In one alternative embodiment, alkaline conditioning media 42 is arranged on second support grid 40. The alkaline conditioning is used to raise or modulate the pH of the wastewater in order to create an optimum environment within the process container for conversion of waste components by the microorganisms in media 38. By focusing pH conditioning, as well as oxygenation and turbulent mixing, within the restricted volume of the process container created by treatment unit 12, systems disclosed herein operate at greater efficiency with increased waste removal at lower energy costs.

In one embodiment, when a loose or granular alkaline material is used as conditioning media 42, it may be contained within a perforated container 43 (for example a basket or bucket with holes) mounted on supports 40 as shown in FIG. 1. According to one aspect of the disclosure, calcium bicarbonate or marble, which are composed of calcium carbonate, is used as the alkaline conditioning media 42 in container 43 because such materials are highly susceptible to attack by acidic agents, even when the solution is a very weak acid, which is a characteristic of most wastewater streams. Other materials with similar properties may be used as the alkaline conditioning media, which is selected to preferably maintain a pH of about 7 within the treatment unit, in particular the volume occupied by media 38. During operation, as discussed in more detail below, acidic water from below is put in contact with the alkaline conditioning media material in container 43 as a result of the uplift of the water column due to the released air from diffuser 32, and the alkaline conditioning media dissolves thereby raising the pH of the wastewater.

Wastewater treatment unit 12 may be suspended in the wastewater treatment vessel 14 by hangers 28. Hangers 28 are configured to mate with rods or the like that are affixed to wastewater treatment vessel 14. Alternatively, or in addition, wastewater treatment unit 12 may be provided with legs, in which case hangers 28 are used for stabilization. A mounting assembly using any combination of hangers, legs and the like is adjustable so that directional outflow jets 26 are arranged at the water level (L) as previously described. In this manner, wastewater treatment unit 12 is generally vertically arranged inside vessel 14 at a controlled depth. In some embodiments, wastewater treatment unit 12 is about 16 inches in diameter in the cylindrical body section and varies from 36 inches to 102 inches in length or height. Additional vertical length provides for additional space in which biological organism supporting media can be arranged. Additional media being present may enhance biological activity. Further details of embodiments of wastewater treatment unit 12 are shown in FIGS. 2-7.

In a further aspect of the disclosure, wastewater treatment system 10 includes controller 44, configured to control air pump 46 to provide pressurized air via air line 30. Controller 44 may control the air supply to air line 30 based on preset time periods or feedback from optional sensors 48. Such sensors may comprise various wastewater chemistry/characteristic sensors as are known in the art, such as dissolved oxygen or pH sensors. Sensors 48 are in wired or wireless communication with a controller 44. The controller 44 includes a microprocessor and memory and other computing components and software as may be configured by persons of ordinary skill based on the present disclosure.

Figure 1A:
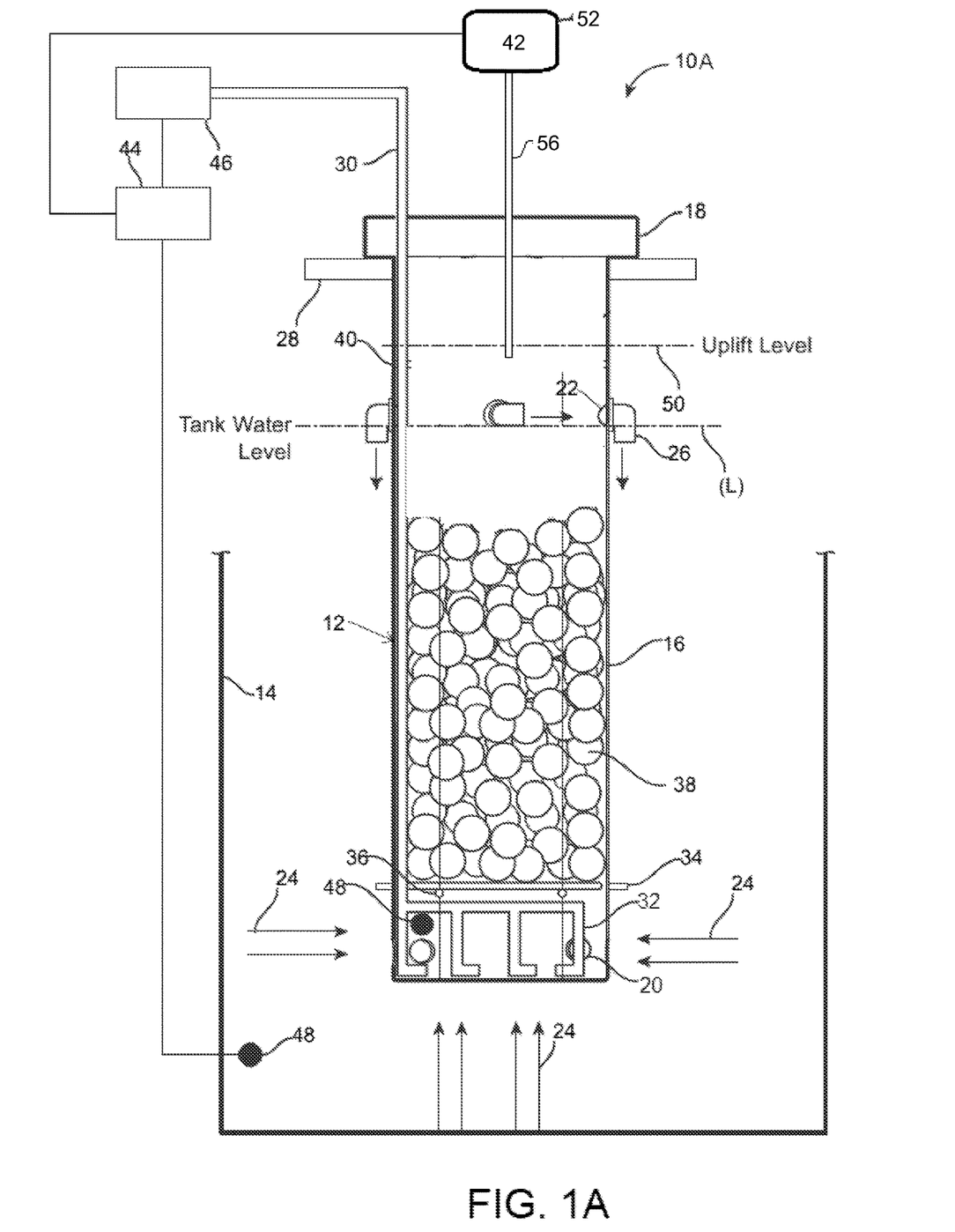
FIG. 1A is a schematic depiction of an alternative embodiment of a treatment system at rest according to the present disclosure.
Figure 2:
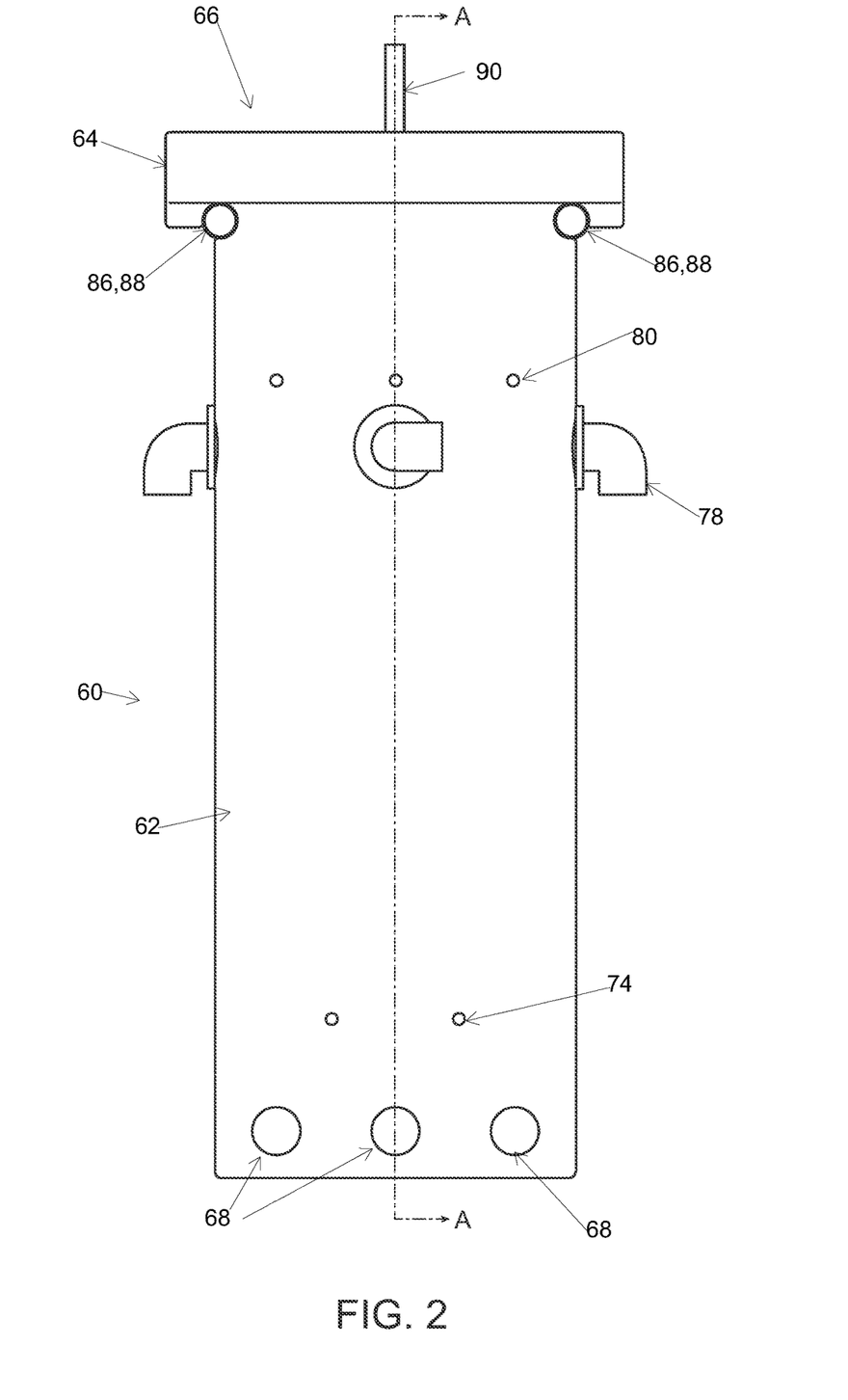
FIG. 2 is a partial side view of a treatment unit for use in a treatment system according to an embodiment of the present disclosure.

In one embodiment, one or more sensors 48 comprise pH meters, in particular pH meters disposed within treatment unit 12. In such an embodiment, controller 44 can be configured to alert a user when the alkaline material in container 43 has to be replaced. Alternatively, a sensor can be provided that measures a quantity of alkaline material in container 43. When the alkaline conditioning media is depleted, a user can be notified to replenish it. According to a further alternative embodiment, as shown in FIG. 1A, controller 44 can be further configured to control dispenser 52 that dispenses a liquid or powdered alkaline modulating media 42 via a dispensing pipe 56. For example, in such an embodiment, dispenser 52 may be a reservoir with an electronically controlled metering valve. As the pH sensor 48 within treatment unit 12 detects a change in pH, controller 44 controls the dispenser to dispense an appropriate quantity of liquid or powdered alkaline modulating medium to maintain a predetermined pH level. Controller 44 can also be configured to control a pump that pumps wastewater into wastewater treatment vessel 14. Dispensing the alkaline modulating media directly into the turbulent uplift zone created by air diffuser 32 release of air, enhances mixing of the modulating media with the wastewater to achieve a more uniform and stable environment for the microorganisms within treatment unit 12 as compared to attempting to pH modulate, mix and aerate an entire tank, such as vessel 14, which is most commonly attempted in prior/existing systems. Dissolved oxygen sensor(s) would be in an array outside the treatment unit.

In operation of system 10, air pump 46 is activated and air is forced into wastewater treatment unit 12 via air line 30 and through air diffuser 32. When the air is injected into wastewater treatment unit 12, the water level inside wastewater treatment unit 12 rises due to the uplifting force of rising air bubbles released through air diffuser 32. The water level within cylindrical body 16 rises to the uplift level 50. According to one aspect of the disclosure, uplift level 50 is about six inches above the tank water level (L). Where a fixed container of alkaline modulating media is used, such as in the embodiment of FIG. 1, the wastewater is raised sufficiently so that it is in contact with the material in container 43. During an uplift, about 2 to 6 inches of alkaline modulating media may be submerged. The dynamic environment created by the air and water uplift causes media 38 not only to be raised up but also to splash up and down and sluff off growth on the media. According to one aspect of the disclosure, the bottom of wastewater treatment unit 12 is a grating, mesh, or the like, so that solids can settle out of the treatment unit. The turbulence created also diffuses the incoming air into smaller bubbles. As the bubbles rise through wastewater treatment unit 12 and media 38, the bubbles are broken down into smaller and smaller bubbles, which increases oxygen saturation into the water and enhances aerobic activity.

According to another aspect of the disclosure, air pump 46 is cycled on and off. When air pump 46 is cycled off, the water level drops to the tank water level (L) and media 38 sinks and settles in wastewater treatment unit 12. When the air pump 46 is turned on, the water level rises and media 38 is lifted and mixed as described above. In one example, a typical cycle may be about 15 minutes off every 6 hours.

When the wastewater inside wastewater treatment unit 12 lifts or is raised by the incoming air flow, the wastewater rises to a level above the directional outflow jets 26. The directional outflow jets 26 can be aimed vertically upwards, downwards, horizontally, or another angle. As shown in FIG. 1, directional outflow jets 26 are directed vertically downward and one directional outflow jet 26 is horizontal. Directional outflow jets 26 stir the liquid in vessel 14. According to one aspect of the disclosure, there is a flow of about 15 to 20 gallons per minute from each directional outflow jet 26, when four directional outflow jets 26 are provided.

In a further aspect of systems and methods disclosed herein, with system 10 delivering air into wastewater treatment unit 12, bubbles from diffuser 32 carry air and gases up through the liquid column pushing them higher, and around the perimeter of the cylindrical vessel and to outflow perforations 22. Outflow perforations 22 may be placed either at, above or below the liquid level based upon need. Various outflow attachments may be placed into or inserted into outflow perforations 22 to control the flow of liquid that will be bubbled above them. Directional outflow jets 26 are one example. Other attachments as may be configured by persons of ordinary skill based on the teachings contained herein may circulate the liquid vertically, with or without extensions, or in a circular whirlpool manner, and/or a combination of vertically and whirlpool, and may be placed so that the liquid coming out is pushed out or drained out and then splashes down on top of the liquid in the greater vessel.

FIGS. 2-7 illustrate further embodiments of a wastewater treatment unit and components for wastewater treatment systems as disclosed herein. As shown therein, wastewater treatment unit 60 comprises cylindrical body 62 with an upper rim 64 defining an open upper end 66. Wastewater inlets 68 are defined around the lower end of cylindrical body 62 below grate 70, which supports lower media bed 72. Small holes 74 in cylindrical body 62, above inlets 68, receive supports 76 for grate 70. Outflow openings 77 are disposed on cylindrical body 62 at a position corresponding to the wastewater level in a water treatment vessel within which the treatment unit is to be placed (such as vessel 14 in FIG. 1, for example) and fitted with adjustable position outlets 78. Small holes 80, just above outlets 78, receive supports 82, which support upper media container 84. Upper media container 84 may be configured as a perforated basket, with perforations adapted in size to the size of the specific media to be contained while allowing free flow of liquids therethrough. Notches 86 on the underside of upper rim 64 may be configured to receive support members 88. Support members 88 may optionally be used to suspend treatment unit 60 in a wastewater treatment vessel. Air inlet pipe 90 supplies air under pressure to air diffuser 92, disposed under lower media grate 70. Components of embodiments shown in FIGS. 2-7 operate substantially as the corresponding components in the embodiments of FIGS. 1 and 1A unless otherwise stated.

Figure 3:
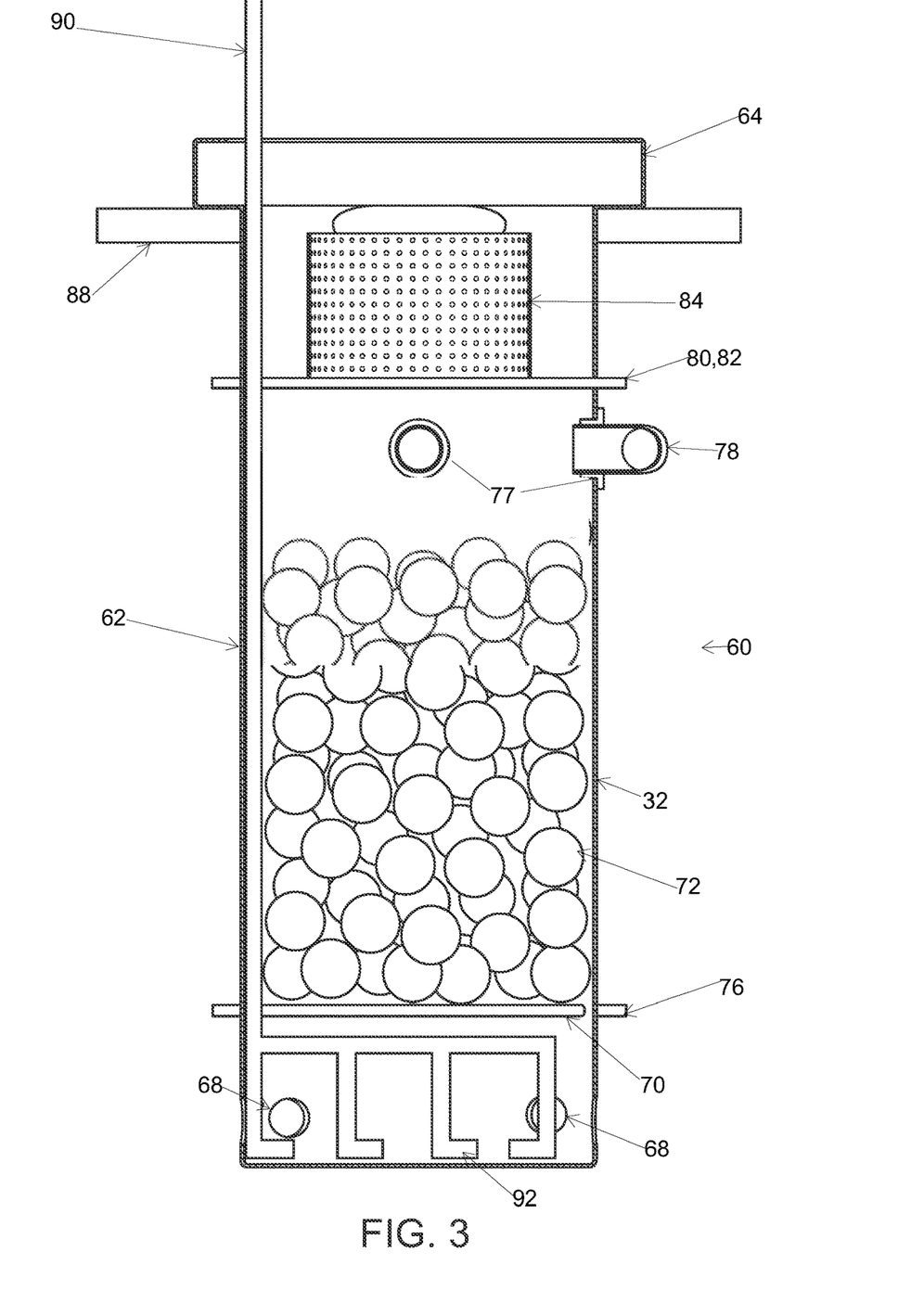
FIG. 3 is a partial cross-section of the treatment unit of FIG. 2.
Figure 4:
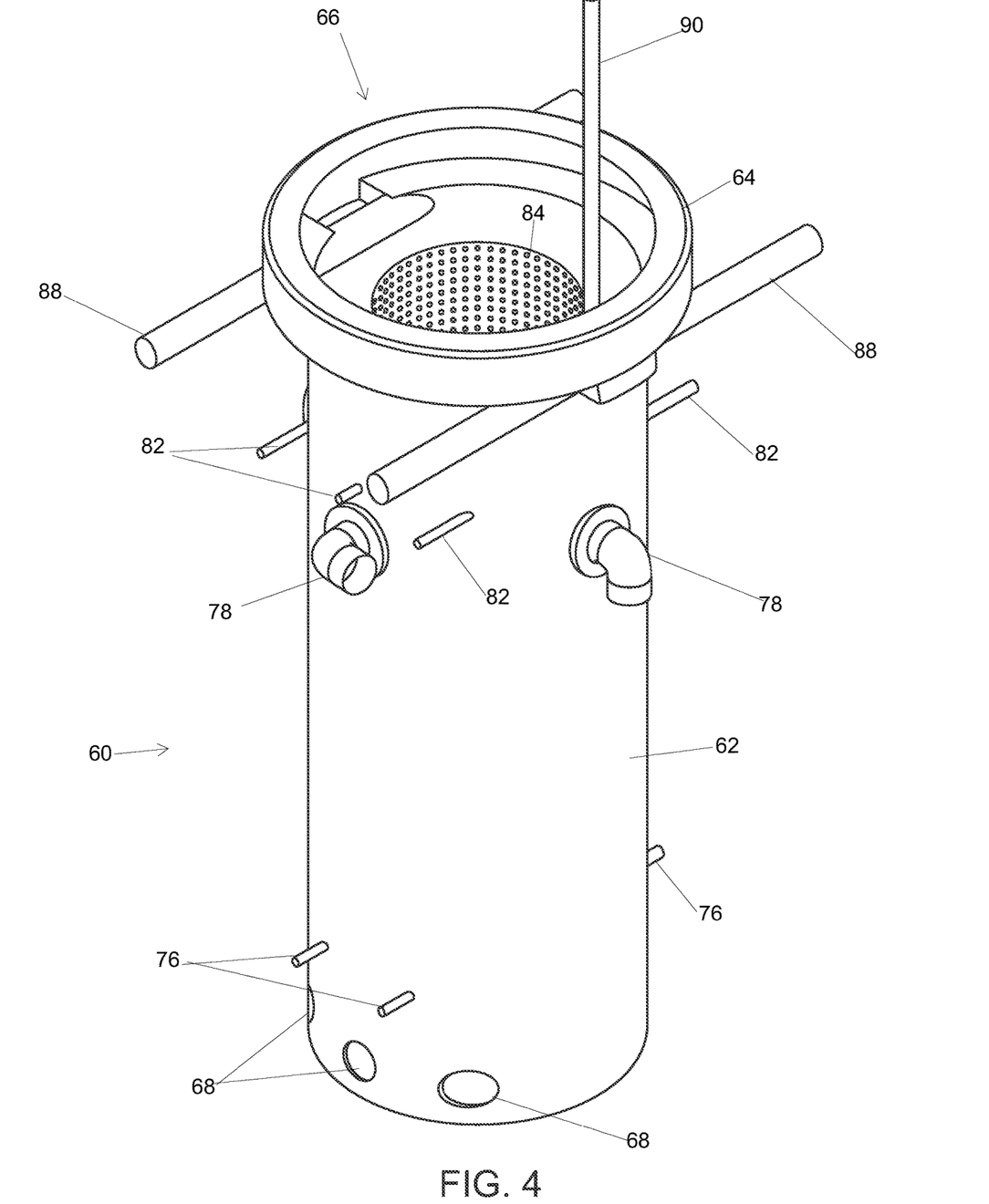
FIG. 4 is a perspective view of an embodiment of a treatment unit according to an embodiment of the present disclosure.
Figure 5:
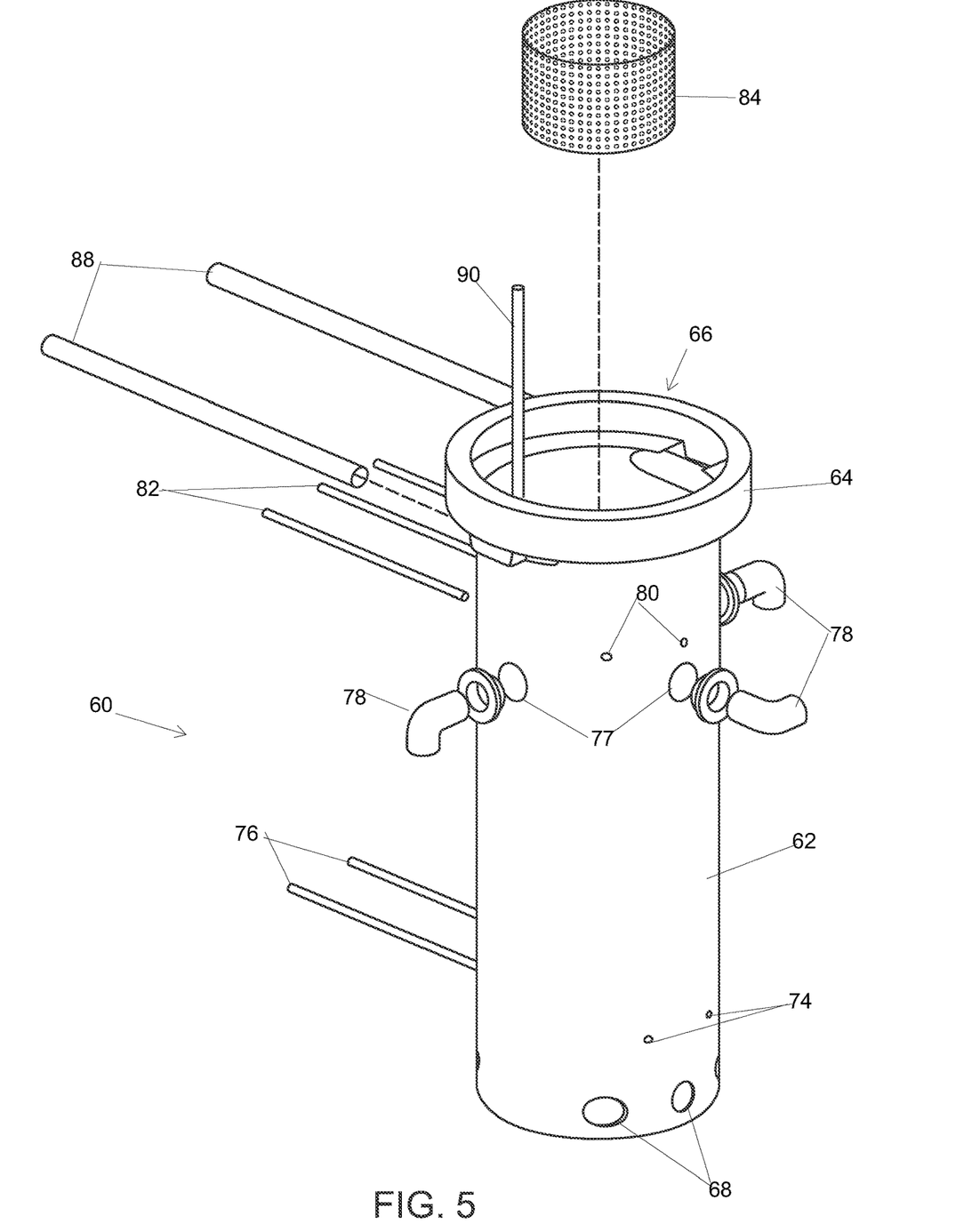
FIG. 5 is an exploded perspective view of a treatment unit according to an embodiment of the present disclosure.
Figure 6:
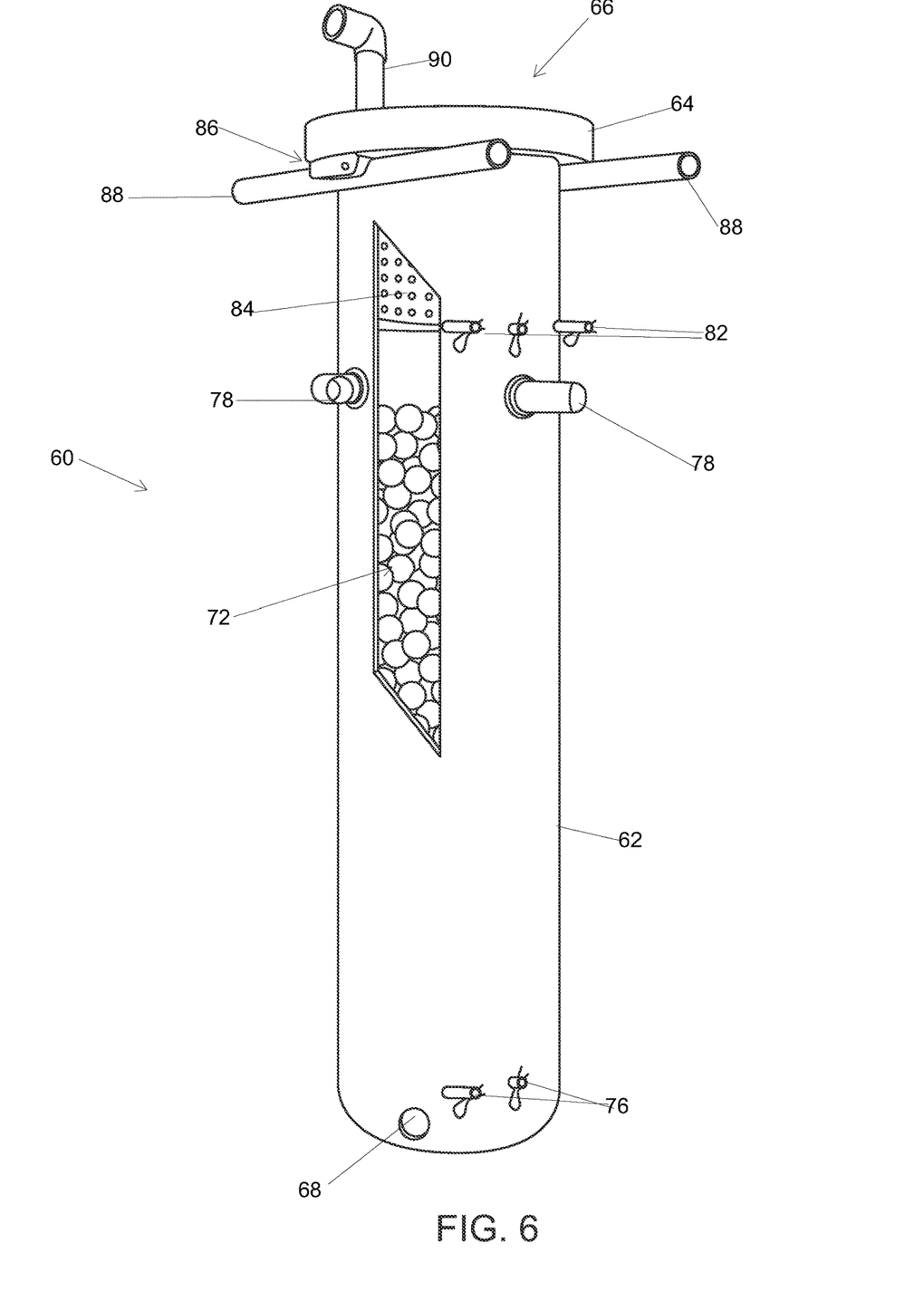
FIG. 6 is partial cut-away perspective view of a treatment unit according to an embodiment of the present disclosure.
Figure 7:
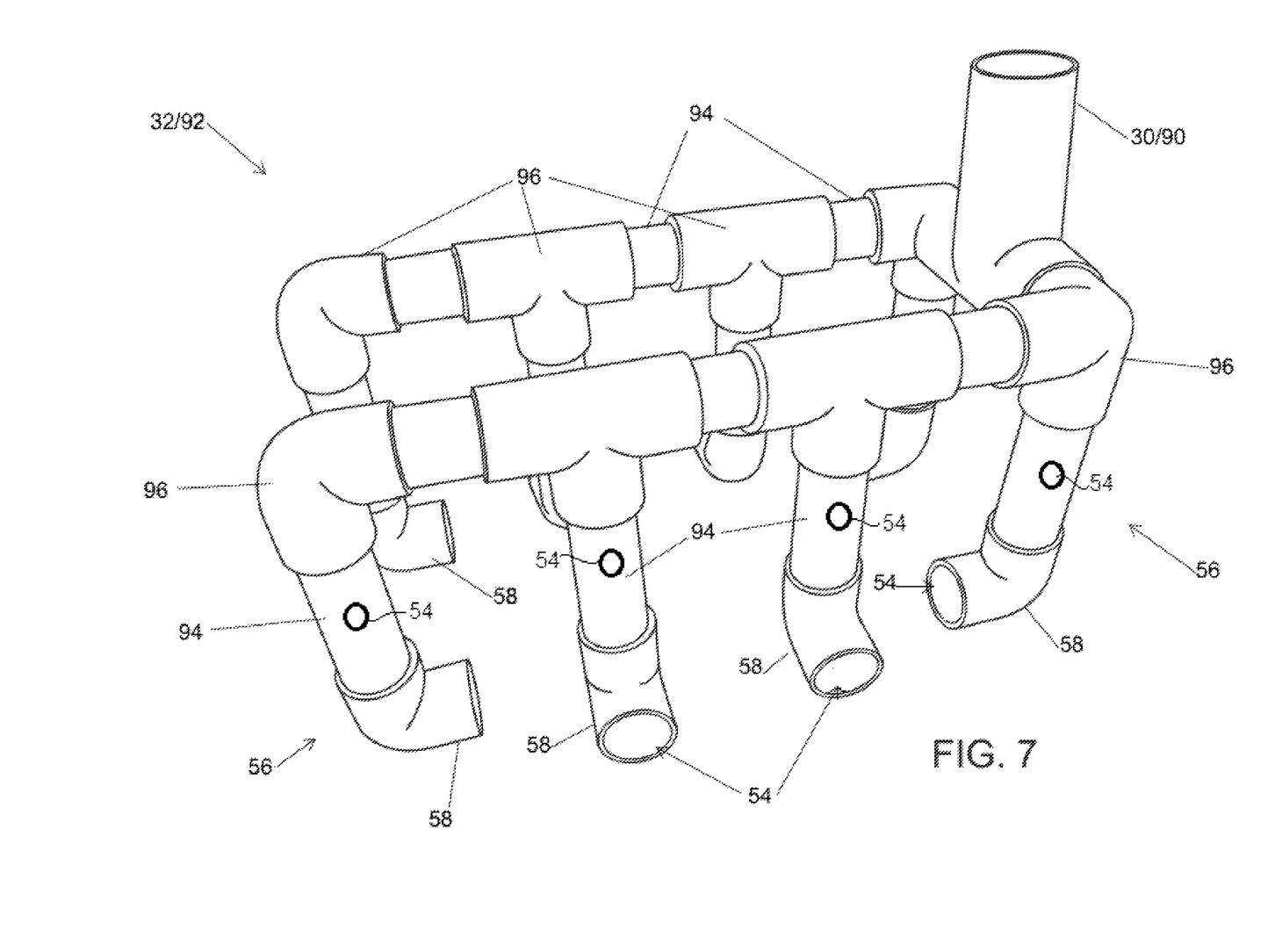
FIG. 7 is a detailed view of an air diffuser for using in a treatment unit of the present disclosure.

Details of embodiments of diffuser 32/92 can also be seen in FIGS. 3 and 7. Air outlet holes and pipe open ends 54 in air diffuser 32 can vary in size from about 0.125 inch to 0.5 inch. The small holes provide smaller bubbles in wastewater treatment unit 12, which enhances biological activity as mentioned above. Tubes or arms 56 of the air diffuser may extend in multiple directions at different lengths. FIG. 7 shows a detailed view of an embodiment of air diffuser 32/92 and a portion of its air supply line 30/90. As shown, the diffuser has horizontally oriented outlet fittings 58 presenting outlet holes 54. Outlet holes 54 in pipes 94 are preferably presented in pairs, spaced 180 degrees apart around the periphery of the pipes in this embodiment. Outlet fittings 58 can be rotated and locked in place in other orientations. Additionally or alternatively, the air diffuser can include outlet holes oriented in multiple directions, such as vertically or horizontally. According to one aspect of the disclosure, the air diffuser comprises pipes 94 and connector fittings 96 of one or more diameters. In some embodiments, the diameter of pipes 94 may be in a range from about 0.25 inch to 1 inch.

In one non-limiting example, an embodiment of a wastewater treatment unit may be configured with parameters as set out in Table 1 below:

TABLE 1

Example 1 - Technical Specifications

| Parameter | Specification |
| --- | --- |
| BOD reduction | 3 to 4 lbs/d |
| Air supply | 7.1 cfm (200 lpm) at 4-5 psi |
| Pod diameter | 16" |
| Pod height | 56" to 72" |
| Lower media bed | High-efficiency plastic SAF ~100 ft$^2$ total surface area |
| Upper media bed | Passive alkalinity control ~1 ft$^3$ |

In another aspect of the present disclosure, a method for treatment of wastewater using a treatment system as described herein may be summarized as follows:

1. Air supply cycle time is determined by a control timer setting and may be adjusted per influent strength and/or hydraulic flow.
2. Air is released from the bottom of the treatment unit.
3. The air/effluent mixture passes through and over a lower media, which may be in one example a plastic submerged aerated filter (SAF) media. The media provides surface area for aerobic microorganisms to attach and proliferate. The media shears coarse bubbles into finer and finer bubbles as the air rises vertically, improving oxygen transfer and reducing energy consumption with a smaller aerator.
4. The aggressive aeration within the treatment unit creates a "chimney" effect that provides media scouring.
5. Effluent passes through a perforated container of replenishable alkalinity control media.
6. The treatment unit contains horizontal discharge nozzles near the top of the fluid level for recirculation. This results in dilution of the incoming waste stream and a whirlpool effect of oxygenation surrounding the treatment unit. When in a serial configuration of multiple tanks, staged segregation of various microorganisms will occur along with dilution. This results in minimal sludge accumulation.

Figure 8:
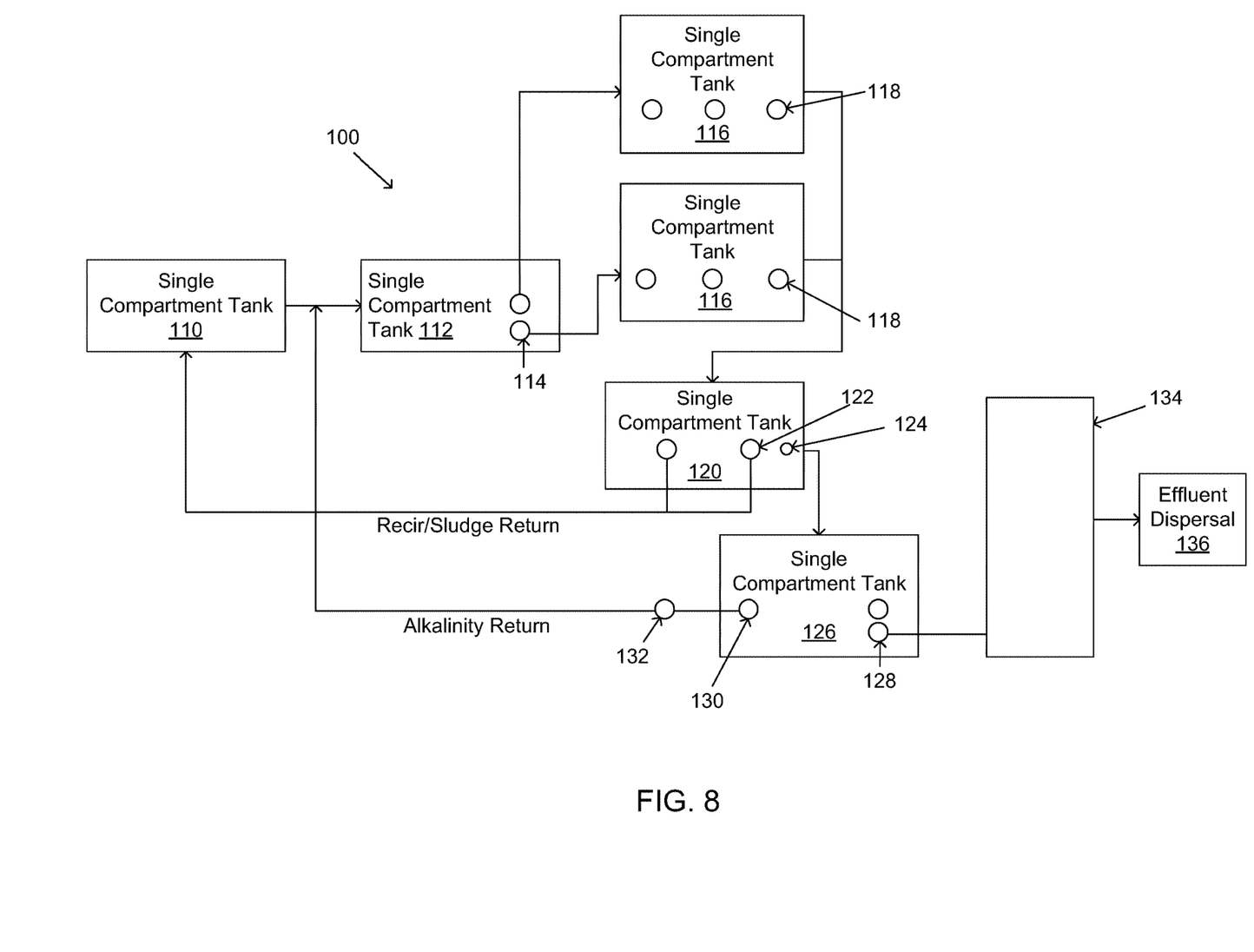
FIG. 8 is a schematic diagram showing another embodiment of a treatment system according to the present disclosure.
Figure 9:
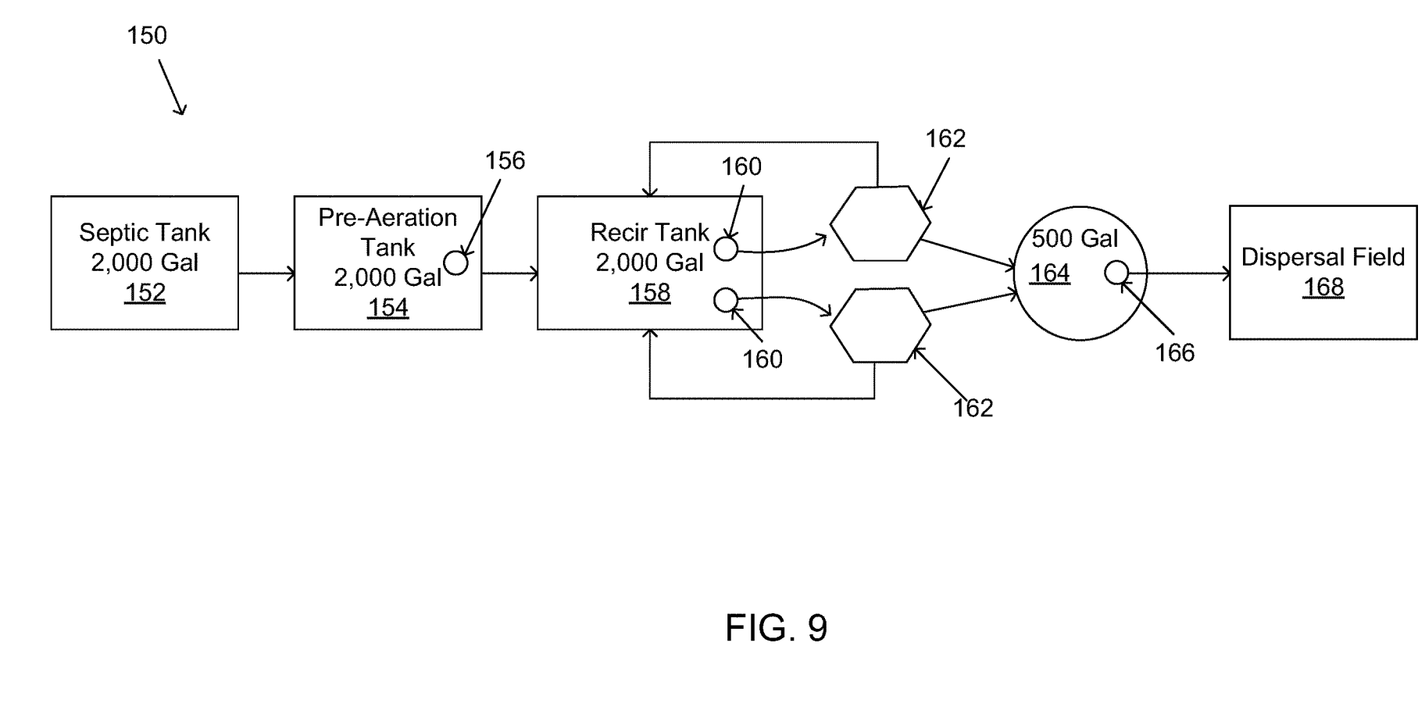
FIG. 9 is a schematic diagram showing a further embodiment of a treatment system according to the present disclosure.

Further examples of systems according to the present disclosure are shown in FIGS. 8 and 9. System 100, shown in FIG. 8, is designed to handle a hydraulic influent in the range of about 25,000 LPD (liters per day) with an organic solids component of approximately 22 KG BOD/Day, producing an effluent at approximately 30 MG/L BODS and 30 MG/L TSS (total suspended solids). In system 100, influent is initially received in primary tank 110, which may be configured as a single compartment tank with a capacity of about 3500 imp gal. Thereafter, the influent wastewater stream is transferred to flow equalization tank, also a single compartment tank, but with a capacity of about 4500 imp gal. Flow equalization tank 112 contains two timed dose effluent pumps 114, which transfer the wastewater stream to two single compartment pre-aeration tanks 116, each with a capacity of about 2000 imp gal. Positioned with each of pre-aeration tanks 116 are three treatment units 118. In this example, the treatment units are configured substantially as treatment unit 60, shown FIGS. 2-6, constructed with 16 inch diameter cylindrical bodies forming the process containers. Wastewater treatment units 118 (six in total) are operated substantially as described above. Outflow from pre-aeration tanks 116 is combined and directed to clarifier tank 120, a single compartment tank with a capacity of about 2000 imp gal. Two timed dose sludge return pumps 122 are positioned in clarifier tank 120 to remove sludge and recirculate it back to primary tank 110. The clarified effluent is filtered through an effluent filter 124. The liquids process stream from clarifier tank 120 is directed to dosing tank 126, a single compartment tank with a capacity of approximately 4500 imp gal. Tank 126 includes timed dose alkalinity pump 130 directing a portion of the liquids through alkalinity basin 132 (in one embodiment a thirty inch diameter alkalinity basin) and recirculating that portion back for input to tank 112, mixed with the new influent wastewater stream. Tank 126 also includes one or more pumps 128 delivering the wastewater stream to multiple biofilter pods 134, which may be configured as aerobic trickle bed treatment reactors. Treated liquids from biofilter pods is directed to appropriate effluent dispersal 136.

System 150, shown in FIG. 9, is designed to lower load levels than system 100 in the range of about 1000 GPD (gallons per day) with organic solids in the range of about 600 MG/L (about 5 lbs/day) BOD. System 150 comprises initial 2000 gal septic tank 152, which receives the raw influent stream. From septic tank 152, the wastewater stream is delivered to pre-aeration tank 154. Pre-aeration tank 154 is another 2000 gal tank, but containing one treatment unit 156, which may be configured as shown above, for example in FIGS. 1-6. Outflow from tank 154 is directed to 2000 gal recirculation tank 158, containing pumps 160 to deliver the wastewater stream to two aerobic bioreactors 162. A portion of the liquid from bioreactors 162 is directed back into recirculating tank 158 and remaining outflow from bioreactors 162 is directed to 500 gal dosing tank 164, which contains timed effluent pump 166. Timed dose effluent pump 166 delivers the treated effluent to dispersal field 168, which in this embodiment may be a low pressure pipe (LPP) of about 1425 sq. ft.

Further embodiments, features, aspects and advantages of the present disclosure are set forth in this and the following paragraphs. In one embodiment, treatment is effected as a result of cellular multiplication and metabolism by microorganisms brought into contact with the constituents in the waste stream. These life processes are directly regulated by and dependent upon the amount of oxygen dissolved into the water; oxygen is needed in order to ensure active microorganisms life of aerobic microorganisms. The normal oxygen supply in the liquid waste, which is the oxygen dissolved in the water, is rapidly depleted by microorganisms. It is therefore necessary to introduce additional oxygen into the waste stream to ensure that the process of aerobic respiration and cellular metabolism continues. What is needed is a system to efficiently treat wastewater that is cost effective at higher levels of biochemical oxygen demand (BOD) and/or chemical oxygen demand (COD).

According to one aspect of the disclosure, an apparatus for treating wastewater or non-potable water comprises a submerged, stand-alone, substantially cylindrical treatment unit that is perforated at its longitudinal lower end and has openings at a resting liquid level. The treatment unit is generally vertically arranged inside a larger vessel at a controlled depth. Inside of the treatment unit comprises an air grid, an aerobic microorganisms growth media, a permeable grid separating the air grid from the microorganism growth media, and a vessel configured to be filled with a consumable porous material arranged above the microorganisms growth media. One or more directional discharge outlets are arranged at the top openings of the treatment unit at the water level of the larger vessel.

In operation, when the air grid is charged with air, an air pressure induced lifting action occurs creating an uplift or swelling of liquid (wastewater) and media to move highly aerated liquor through the aerobic microorganisms growth media (media). A vessel of a porous material, which is alkali, is suspended so that the upswelling liquid contacts the porous material. As the liquid rises and bubbles into and through the aerobic microorganisms growth media, the liquid can be and/or become acidic due to the digestion of the wastewater. Upon contacting the alkali material, the alkali material is dissolved to bring the wastewater back from an acidic state to neutral pH state.

The airlifted upswell of the internal liquid in the reactor is at a higher elevation than the larger containment vessel giving the directional discharge outlets head or velocity. This velocity can and will create stirring and mixing in an area surrounding the treatment unit. The outlet heads can be directed horizontally to create a swirling gradated aerated zone, downward to create deeper aerated mixing, or upward for aerated splashing. Free interchange of mixed and unmixed liquor is provided via the perforations in the bottom of the treatment unit wall.

According to one aspect of the disclosure, the unit cycles off and on by cycling the air supply so that the media can decant and solids can settle out of the treatment unit.

According to one aspect of the disclosure, the air grid is a pressurized air grid arranged at a lower end of the treatment unit.

According to one aspect of the disclosure, the consumable porous material is alkali in nature. Preferably, the consumable porous material is marble, limestone, seashells, calcite, or the like.

According to one aspect of the disclosure, the treatment unit is a container within which the smaller of the length or width (diameter) is less than 2.5 times a depth of the liquid.

According to one aspect of the disclosure, the treatment unit is circular, oval, square, rectangular, a polygon, any linear shape, or the like. One or both of the bottom and bottom portion of the treatment unit are porous, preferably due to holes. The holes can be uniform or a variety of shapes and sizes. According to one aspect of the disclosure, the holes are dimensioned to act as a filter or larger so that no screening or filtering takes place.

According to one aspect of the disclosure, the bottom of the treatment unit is arranged at various depths in the larger vessel to circulate liquids back up to the top or the treatment unit may be placed at or near the bottom of the vessel to bring to the top settled out or precipitated out solids and stir them back into the larger vessel.

According to one aspect of the disclosure, liquids may be treated with different specific gravities and different properties.

According to one aspect of the disclosure, stirring and airlift is provided by pressurized air or gases through either a grid or a diffuser apparatus. Bubbles may be fine, medium, or large depending upon treatment requirements. If porous holes in the bottom of the container are larger than the media being used, a grate must be placed above the diffuser, or a grate may be placed above the diffuser so media does not settle into diffuser grid area.

According to one aspect of the disclosure, the media has a specific gravity that is less than, greater than, or the same as the liquid that is being treated. Media may also be consumable or partially consumable. For example, the media can be plastic, salt encrusted plastic, calcium, foam glass, or the like.

The media, when the aerator is on, is lifted so that it moves or continuously moves such that stirring occurs and then settles. The system is configured with a timer so that a time off allows the system to rest and decant itself or flake off, settle off, or settle back down. When on, the system's media may be pushed up again up to and sometimes above the vessel's standing water or liquid level.

According to one aspect of the disclosure, when on, air is released into the treatment unit that forces air or gases up through the liquid column and pushes the liquid and/or the media higher. Relief holes or exhaust ports are arranged around a perimeter of the treatment unit. The treatment unit is placed either at, above or below the liquid level based upon need. Various attachments may be placed in these exhaust ports to control the flow of liquid that will be bubbled above them. As an example, when the system is not running the exhaust holes will be at or below the actual liquid level in the vessel. When the system is running, liquid inside the treatment unit will be at a level greater than the actual liquid level of the larger vessel. The attachments may either circulate the liquid vertically or in a circular whirlpool manner, or both, and may be placed so that the liquid coming out is pushed out or drained out and then splashes down on top of the liquid in the greater vessel.

According to one aspect of the disclosure, a grate is arranged vertically above the outlet or the exhaust ports. This grate is in place to hold the media down and optionally to hold the treatment agent. The treatment agent may be anionic, cationic, calcium carbonate, sodium bicarbonate, or other materials that when the water rises through the air-lift function, the water will come in contact with the material that is held above the grate. The material in a basket may be used as a ballast for the entire apparatus.

According to one aspect of the disclosure, legs may be used to support the treatment unit in various vessels. Full units or treatment units may be linked together to form a chain.

The foregoing has been a detailed description of illustrative embodiments of the disclosure. It is noted that in the present specification and claims appended hereto, conjunctive language such as is used in the phrases "at least one of X, Y and Z" and "one or more of X, Y, and Z," unless specifically stated or indicated otherwise, shall be taken to mean that each item in the conjunctive list can be present in any number exclusive of every other item in the list or in any number in combination with any or all other item(s) in the conjunctive list, each of which may also be present in any number. Applying this general rule, the conjunctive phrases in the foregoing examples in which the conjunctive list consists of X, Y, and Z shall each encompass: one or more of X; one or more of Y; one or more of Z; one or more of X and one or more of Y; one or more of Y and one or more of Z; one or more of X and one or more of Z; and one or more of X, one or more of Y and one or more of Z.

Various modifications and additions can be made without departing from the spirit and scope of this disclosure. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present disclosure. Additionally, although particular methods herein may be illustrated and/or described as being performed in a specific order, the ordering is highly variable within ordinary skill to achieve aspects of the present disclosure. Accordingly, this description is meant to be taken only by way of example, and not to otherwise limit the scope of this disclosure.

Exemplary embodiments have been disclosed above and illustrated in the accompanying drawings. It will be understood by those skilled in the art that various changes, omissions and additions may be made to that which is specifically disclosed herein without departing from the spirit and scope of the present disclosure.

What is claimed is:

1. A water treatment apparatus, comprising:
a process container having a lower end and an upper end, wherein the process container is configured to be partially submerged in a water treatment vessel with the lower end submerged and the upper end extending above a waterline in the water treatment vessel;
one or more intake openings at the lower end of the process container;
a first media support positioned above said intake openings, the process container defining a process volume between said waterline and the first media support;
an air diffuser disposed below the first media support configured to release air bubbles substantially across a cross-section of the process container when supplied from an air source, the bubbles causing turbulent uplift of water within the process container;
an aerobic microorganism supporting media disposed above the first media support, said media occupying 50-80% of the process volume and comprising media elements having openings configured to interact with bubbles released from the air diffuser and a neutral or negative buoyancy selected to provide media uplift and turbulent mixing of the media elements with the turbulent uplift of water in the process container in response to bubble release from the air diffuser;
one or more outflow openings in the process container positioned at least approximately at the waterline; and
alkaline modulating media dispensable into the area of turbulent uplift of water above the waterline.

2. The water treatment apparatus of claim 1, further comprising directionally positionable outflow attachments disposed in the one or more outflow openings.

3. The water treatment apparatus of claim 1, further comprising a second media support configured to support a dissolvable alkaline modulating media at a distance above the waterline selected to expose the dissolvable alkaline modulating media to water within the process container when air bubbles released by the air diffuser cause the uplift of water within the process container, whereby the alkaline modulating media is dispensed by dissolving into the uplifted water.

4. The water treatment apparatus of claim 3, wherein said second media support comprises a perforated container and the alkaline modulating media comprises a granular or chunk material disposed in said perforated container.

5. The water treatment apparatus of claim 1, further comprising an air supply communicating with the air diffuser.

6. The water treatment apparatus of claim 5, further comprising an air inlet pipe extending from a position above the upper end of the process container to and communicating with the air diffuser, said air inlet pipe further communicating with the air supply.

7. The water treatment apparatus of claim 6, further comprising a controller configured to regulate the air supply to the diffuser.

8. The water treatment apparatus of claim 7, wherein the controller comprises an on/off timer.

9. The water treatment apparatus of claim 7, further comprising at least one water characteristic monitor communicating with the controller.

10. The water treatment apparatus of claim 9, wherein the controller is configured to control air supply on and off times based on water characteristics communicated by said at least one characteristic monitor.

11. The water treatment apparatus of claim 1, further comprising a controllable dispenser containing the alkaline modulating media positioned to dispense the alkaline modulating media into the process container in response to a control signal.

12. The water treatment apparatus of claim 11, further comprising a controller configured to control the release of alkaline modulating media from the dispenser; and at least one pH sensor in the process container configured to provide a pH level indication, wherein the controller is configured to signal the dispenser to dispense alkaline modulating media when the indicated pH level in the process container meets preset levels.

13. A water treatment system, comprising:
a water treatment vessel configured to contain water to be treated up to a water level;
a water treatment unit comprising a process container having a lower end and an upper end disposed in the water treatment vessel with the upper end extending above the water level;
one or more water intake openings at the lower end of the process container;
a first media support positioned above said intake openings;
a first media selected to support growth of biological organisms disposed on the first media support;
an air diffuser disposed below the first media support configured to release bubbles substantially across a cross-section of the process container when supplied from an air source;
an aerobic microorganism supporting media disposed above the first media support, said media occupying at least 50% of the process volume and comprising media elements having openings configured to interact with bubbles released from the air diffuser and a neutral or negative buoyancy selected to provide media uplift and turbulent mixing of the media elements with the turbulent uplift of water in the process container in response to bubble release from the air diffuser;
one or more outflow openings in the process container positioned at least approximately at the waterline;
alkaline modulating media dispensable into the area of turbulent uplift of water above the waterline;
an air supply communicating with the air diffuser; and
a controller configured to regulate the air supply to control the air to the air diffuser.

14. The water treatment system of claim 13, further comprising a second media support configured to support a dissolvable alkaline modulating media at a distance above the waterline selected to expose the dissolvable alkaline modulating media to water within the process container when air bubbles released by the air diffuser cause the uplift of water within the process container, whereby the alkaline modulating media is dispensed by dissolving into the uplifted water.

15. The water treatment system of claim 14, wherein said second media support comprises a perforated container and the alkaline modulating media comprises a granular or chunk material disposed in said perforated container.

16. The water treatment system of claim 13, further comprising directionally positionable attachments disposed in the one or more outflow openings.

17. The water treatment system of claim 13, wherein the controller comprises an on/off timer.

18. The water treatment system of claim 13, further comprising at least one water characteristic monitor communicating with the controller wherein the controller is configured to control air supply on and off times based on water characteristics communicated by said at least one water characteristic monitor.

19. The water treatment system of claim 13, further comprising a controllable dispenser containing the alkaline modulating media positioned to dispense the alkaline modulating media into the process container in response to a control signal.

20. The water treatment system of claim 19, further comprising a controller configured to control the release of alkaline modulating media from the dispenser; and at least one pH sensor in the process container configured to provide a pH level indication, wherein the controller is configured to signal the dispenser to dispense alkaline modulating media when the indicated pH level in the process container meets preset levels.

21. A method of treating water, comprising:
charging air to an air grid arranged at a vertically lower end of a process container;
creating a liquid upswell in the process container due to the charging of the air grid;
turbulently mixing an aerobic growth media in the process container due to the upswell;
mixing aerated water through the aerobic growth media in the process container due to the upswell; and
mixing the water in the process container with an alkaline modulating media in the turbulent upswell created by the charging of the air grid.

22. The method of treating water of claim 21, further comprising:
ejecting aerated water from the process container due to the upswell;
mixing the aerated water with water in a larger vessel in which the process container is disposed, said mixing being vertically and/or in a circular manner in the larger vessel.

23. The method of treating water of claim 21, wherein the alkaline modulating media is suspended above the aerobic growth media in the process container.

24. The method of treating water of claim 21, wherein:
said creating a liquid upswell causes the liquid to rise up to at least partially submerge the suspended alkaline modulating media; and
said mixing the water in the process container with an alkaline modulating media comprises the alkaline modulating media dissolving in the liquid upswell.

25. The method of treating water of claim 21, further comprising monitoring a characteristic of the water in the process container, and wherein said charging the air grid comprises controlling delivery of air to the air grid based on the monitored characteristic.

26. The method of treating water of claim 21, further comprising monitoring pH of the water in the process container, and wherein said mixing the water in the process container with an alkaline modulating media comprises adding the alkaline modulating media based on monitored pH falling outside a set threshold range.

27. The method of treating water of claim 26, wherein said adding the alkaline modulating media comprises dosing of said modulating media from a dispenser into the liquid upswell.

28. A method of treating water, comprising:
positioning a process container in a larger vessel containing water to be treated, the process container positioned with a portion of the process container above a water line in the larger vessel;
charging air to an air grid arranged at a vertically lower end of a process container;
creating a liquid upswell in the process container due to the charging of the air grid;
turbulently mixing an aerobic growth media in the process container due to the upswell;
mixing water aerated by the charged air grid through the aerobic growth media in the process container due to the upswell;
mixing the aerated water in the process container with an alkaline modulating media in the turbulent upswell created by the charging of the air grid;
ejecting aerated water from the process container due to the upswell; and
mixing the aerated water with water in the larger vessel outside the process container by said ejecting.

29. The method of treating water of claim 28, wherein:
the alkaline modulating media is suspended above the aerobic growth media in the process container;
said creating a liquid upswell causes the liquid to rise up to at least partially submerge the suspended alkaline modulating media; and
said mixing the water in the process container with an alkaline modulating media comprises the alkaline modulating media dissolving in the liquid upswell.

30. The method of treating water of claim 28, further comprising monitoring pH of the water in the process container, and wherein:
said mixing the water in the process container with an alkaline modulating media comprises adding the alkaline modulating media based on monitored pH falling outside a set threshold range; and
adding the alkaline modulating media comprises dosing of said modulating media from a dispenser into the liquid upswell.

* * * * *